(12) United States Patent
Johnson et al.

(10) Patent No.: US 6,675,759 B2
(45) Date of Patent: Jan. 13, 2004

(54) CRANKSHAFT DAMPER

(75) Inventors: David H. Johnson, Plymouth, MI (US); Edson Falcão Lopes, Ann Arbor, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/074,266

(22) Filed: Feb. 12, 2002

(65) Prior Publication Data

US 2002/0157501 A1 Oct. 31, 2002

Related U.S. Application Data

(60) Provisional application No. 60/268,197, filed on Feb. 12, 2001.

(51) Int. Cl.[7] .................................................. F02B 75/06
(52) U.S. Cl. ..................................................... 123/192.1
(58) Field of Search .......................... 123/192.1; 474/94

(56) References Cited

U.S. PATENT DOCUMENTS

| 4,834,041 | A | * | 5/1989 | Valev ........................ 123/192.1 |
| 5,303,681 | A | * | 4/1994 | Crofts ....................... 123/192.1 |
| 5,517,957 | A | * | 5/1996 | Wagner et al. ............ 123/192.1 |
| 5,720,248 | A | * | 2/1998 | Crofts ....................... 123/192.1 |
| 5,931,052 | A | * | 8/1999 | Zhao et al. ................ 123/192.1 |
| 5,979,390 | A | * | 11/1999 | Depp et al. ............... 123/192.1 |
| 6,089,204 | A | * | 7/2000 | Shaffer ..................... 123/192.1 |
| 6,283,076 | B1 | * | 9/2001 | Simpson ................... 123/192.1 |

* cited by examiner

Primary Examiner—Henry C. Yuen
Assistant Examiner—Jason Benton
(74) Attorney, Agent, or Firm—A. Michael Tucker; Ronald W. Wangerow

(57) ABSTRACT

A crankshaft damper includes a hub and a rim. The rim has an outer diameter greater than an outer diameter of the hub. A plurality of spokes connects the rim to the hub. An axial inner surface is formed on the rim and projects forwardly of the spokes. A damper support includes a band and a collar. The band is retained to the axial inner surface of the rim and the collar projects radially outwardly beyond the outer diameter of the rim. An elastomeric member is mounted on the collar and faces the rim. A damper is mounted on the elastomeric member and faces the rim. The elastomeric member and damper are positioned radially beyond the rim to dampen torsional and axial vibrations.

20 Claims, 2 Drawing Sheets

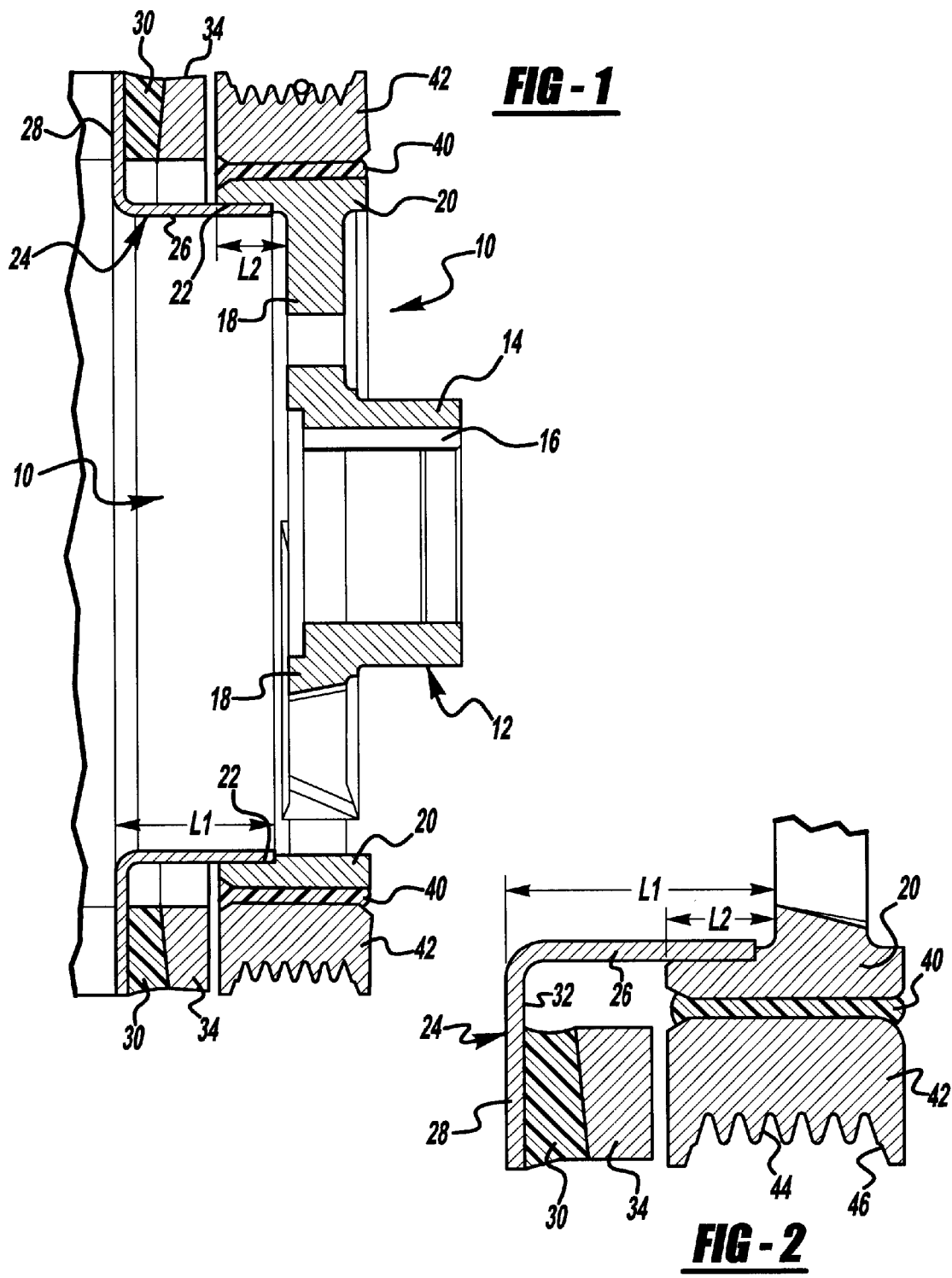

CRANKSHAFT DAMPER

CROSS REFERENCE TO RELATED APPLICATION

This claims the benefit of U.S. provisional patent application identified as Application No. 60/268,197, filed Feb. 12, 2001.

BACKGROUND OF THE INVENTION

This invention relates in general to crankshaft dampers. More specifically, this invention relates to a dual mode damper that is mounted on an engine crankshaft and dampens torsional and axial vibrations.

One type of crankshaft damper is known as a dual frequency torsional vibration damper. This type of damper includes two inertial masses and two elastomeric elements. The elastomeric elements and masses are tuned (by geometry and material selection) to dampen two different torsional frequencies.

Another type of crankshaft damper is known as a dual mode damper. This type of damper includes two masses and two elastomeric elements. The elastomeric elements and masses can be tuned (by geometry and material selection) to dampen axial and/or torsional vibrations.

When an engine crankshaft is rotated, elastomeric members and damping masses of crankshaft dampers counteract vibrations that occur. Typical crankshaft dampers include a hub and a rim. It is known to position elastomeric members and damping masses within an axial inner surface of the rim. This construction obstructs a spoke region of a crankshaft damper, thus inhibiting the performance of service.

BRIEF SUMMARY OF THE INVENTION

This invention includes a crankshaft damper having a damping mass that is mounted away from a spoke region so that service can be performed on the installed crankshaft damper. Furthermore, this invention includes a crankshaft damper that dampens both torsional and axial vibrations transmitted by an engine crankshaft.

In a preferred embodiment, a crankshaft damper includes a hub and a rim. The rim has an outer diameter greater than an outer diameter of the hub. A plurality of spokes connects the rim to the hub. An axial inner surface is formed on the rim and projects forwardly of the spokes. A damper support includes a band and a collar. The band is retained to the axial inner surface of the rim and the collar projects radially outwardly beyond the outer diameter of the rim. An elastomeric member is mounted on the collar and faces the rim. A damper is mounted on the elastomeric member and faces the rim. The elastomeric member and damper are positioned radially beyond the rim to dampen torsional and axial vibrations.

BRIEF DESCRIPTION OF THE DRAWINGS

FIG. 1 is a sectional view of a crankshaft damper according to this invention.

FIG. 2 is an enlarged view of a portion of the crankshaft damper of FIG. 1 illustrated in circle A.

DETAILED DESCRIPTION OF THE PREFERRED EMBODIMENT

Figure 3:
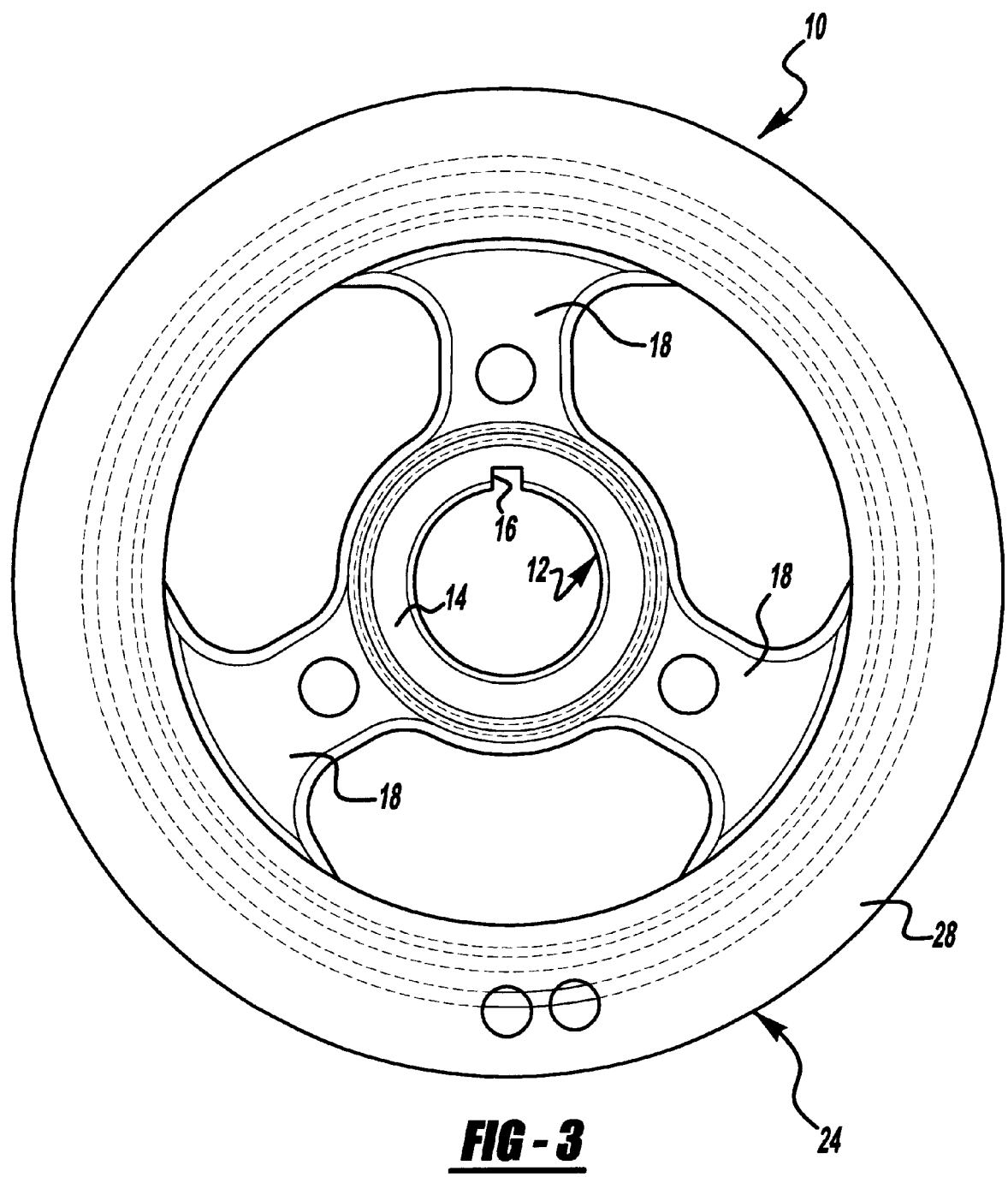
FIG. 3 is an end view of the crankshaft damper of FIG. 1

A crankshaft damper 10 according to this invention is illustrated in FIGS. 1–3. The crankshaft damper 10 is constructed and designed so that it can be coupled to and rotated together with an engine crankshaft (not illustrated). The embodiment of FIGS. 1–3 is one representative embodiment of the crankshaft damper 10 claimed in the attached claims.

The crankshaft damper 10 includes an annular hub 12. The hub 12 has a central cylindrical portion 14 having a keyway 16 formed on its inner cylindrical surface. The cylindrical portion 14 is slipped or fitted over an end of a crankshaft and coupled thereto by a key (not illustrated) fitted into the keyway 16. A plurality of spokes 18 (three are illustrated in FIG. 3) connects the cylindrical portion 14 with an annular rim 20. The rim 20 has an outer diameter greater than an outer diameter of the hub 12. An axial inner surface 22 (i.e., a surface parallel to an axis of the hub 12) of the rim 20 projects forwardly of the spokes 18.

A damper support 24 is formed as an annular band 26 and a radially outwardly projecting collar 28. The band 26 has a length L1 greater than a length L2 of the inner surface 22 of the rim 20. Preferably, the band 26 and collar 28 are integrally formed and can be described as a ring with one flattened edge. An outer surface of the band 26 is pressed into the rim 20 along the inner surface 22. Preferably, a press or interference fit retains the damper support 24 to the hub 12. Adhesives and other materials can be used if desired to retain the damper support 24 to the hub 12.

An annular elastomeric member 30 is provided on an inner surface 32 of the collar 28. An annular damper or mass 34 is provided on an inner surface of the elastomeric member 30. The selection of materials for the elastomeric member 30 and damper 34 and their geometries are designed to dampen vibrations transmitted to the crankshaft damper 10 from the crankshaft. Preferably, the elastomeric member 30 is bonded to the collar 28 and the damper 34. Adhesives and other methods can be used to attach the elements 30 and 34 to the damper support 24.

As illustrated in the figures, the elastomeric member 30 and damper 34 are provided radially outwardly of the rim 20 of the hub 12. The elastomeric member 30 is mounted so that it faces the rim 20. The damper 34 is mounted so that it faces the rim 20 and is between the member 30 and the rim 20. In the event of a separation of the damper 34 from the member 30, the collar 28 acts as a guard and prevents the mass 34 from separating from the crankshaft damper 10.

An elastomeric element 40 is provided on an outer circumference of the rim 20. An outer annular member 42 is provided on an outer circumference of the elastomeric element 40. The outer annular member 42 has at least one pulley groove 44 at its outer surface 46 where a belt (not illustrated) is disposed. The belt transmits the rotation of the crankshaft to at least one piece of auxiliary equipment (not illustrated), such as a power steering pump or an alternator.

The crankshaft damper 10 absorbs and dampens both torsional and axial (also known as bending or linear) vibrations. The elastomeric member 30 has more surface area than prior art elements mounted within the axial inner surface 22 of the rim 20. Prior art devices have a resonance frequency up to approximately 300 Hz. The crankshaft damper 10 can be tuned for a resonance frequency greater than 500 Hz.

The damper support 24 and its members 30 and 34 can be formed separately from the rim 20. Thus, the damper support 24 provides a modular assembly system for the crankshaft damper 10 wherein the damper support 24 is one element of the system and the rim 20 is another element of the system.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A crankshaft damper comprising:
   a hub at a first axial position;
   a rim having an outer diameter greater than the hub;
   means for connecting the rim to the hub;
   an axial inner surface formed on the rim;
   a damper support having a band and a collar, wherein the band is retained to the axial inner surface of the rim, and wherein the collar projects radially outwardly beyond the outer diameter of the rim;
   an elastomeric member mounted on the collar; and
   a damper mounted on the elastomeric members;
   at least one of the elastomeric member and the damper being located at a second axial position that is axially displaced with respect to the first axial position of the hub.

2. The crankshaft damper specified in claim 1 wherein the band and the collar of the damper support are integrally formed.

3. The crankshaft damper specified in claim 1 wherein the collar has a length greater than a length of the axial inner surface.

4. The crankshaft damper specified in claim 1 wherein a second elastomeric member is mounted to an outer circumference of the rim.

5. The crankshaft damper specified in claim 4 wherein an annular member is mounted to an outer circumference of the elastomeric member.

6. A crankshaft damper comprising:
   a hub;
   a rim having an outer diameter greater than the hub;
   means for connecting the rim to the hub;
   an axial inner surface formed on the rim;
   a damper support having a band and a collar, wherein the band is retained to the axial inner surface of the rim, and wherein the collar projects radially outwardly beyond the outer diameter of the rim;
   an elastomeric member mounted on the collar;
   a damper mounted on the elastomeric member;
   a second elastomeric member mounted to an outer circumference of the rim; and
   an annular member mounted to an outer circumference of the second elastomeric member, at least one groove being formed in the annular member.

7. A crankshaft damper comprising:
   a rim having an axial inner surface and an outer circumference;
   a damper provided at a radial position greater than the outer circumference of the rim; and
   means for attaching the damper to the axial inner surface of the rim including a band and a collar.

8. The crankshaft damper specified in claim 7 wherein:
   the band is attached to the axial inner surface of the rim;
   the collar projects radially beyond the outer circumference of the rim, and
   the damper is attached to the collar.

9. The crankshaft damper specified in claim 8 wherein the damper includes an elastomeric member and a mass.

10. A crankshaft damper comprising:
    a rim having an axial inner surface and an outer circumference;
    a damper provided at a radial position greater than the outer circumference of the rim; and
    means for attaching the damper to the axial inner surface of the rim, the rim being attached to a hub.

11. A crankshaft damper comprising:
    a rim having an axial inner surface and an outer circumference:
    a damper provided at a radial position greater than the outer circumference of the rim; and
    means for attaching the damper to the axial inner surface of the rim, an elastomeric member being attached to an outer circumference of the rim.

12. The crankshaft damper specified in claim 11 wherein an annular member is attached to the elastomeric member.

13. A crankshaft damper comprising:
    a hub;
    a rim having an outer diameter greater than the hub;
    a plurality of spokes connecting the rim to the hub;
    an axial inner surface formed on the rim and projecting forward of the spokes;
    a damper support having a band and a collar, wherein the band is retained to the axial inner surface of the rim, and wherein the collar projects radially outwardly beyond the outer diameter of the rim;
    an elastomeric member mounted on the collar and facing the rim; and
    a damper mounted on the elastomeric member and facing the rim,
    wherein the elastomeric member and the damper are positioned radially beyond the rim and to damper torsional and axial vibrations.

14. The crankshaft damper specified in claim 13 wherein the band and the collar of the damper support are integrally formed.

15. The crankshaft damper specified in claim 13 wherein the collar has a length greater than a length of the axial inner surface.

16. The crankshaft damper specified in claim 13 wherein a second elastomeric member is mounted to an outer circumference of the rim.

17. The crankshaft damper specified in claim 16 wherein an annular member is mounted to an outer circumference of the elastomeric member.

18. The crankshaft damper specified in claim 17 wherein at least one groove is formed in the annular member.

19. The crankshaft damper specified in claim 13 wherein the elastomeric member is tuned to provide a relatively high resonance frequency.

20. The crankshaft damper specified in claim 1 wherein both the elastomeric member and the damper are located at a second axial position that is axially displaced with respect to the first axial position of the hub.

* * * * *